United States Patent [19]

Kondoh

[11] Patent Number: 5,460,639
[45] Date of Patent: Oct. 24, 1995

[54] SINTERED CONTACT COMPONENT

[75] Inventor: Katsuyoshi Kondoh, Itami, Japan

[73] Assignee: Sumitomo Electric Industries, Ltd., Osaka, Japan

[21] Appl. No.: 284,986

[22] Filed: Aug. 4, 1994

[30] Foreign Application Priority Data

Aug. 9, 1993 [JP] Japan .................. 5-218130

[51] Int. Cl.$^6$ .................. C22C 29/00
[52] U.S. Cl. .................. 75/231; 75/247
[58] Field of Search .................. 75/231, 247

[56] References Cited

U.S. PATENT DOCUMENTS

| | | | |
|---|---|---|---|
| 3,021,592 | 2/1962 | Herron et al. | 29/182.5 |
| 5,279,638 | 1/1994 | Asada et al. | 75/235 |
| 5,303,617 | 4/1994 | Asada et al. | 75/231 |
| 5,326,384 | 7/1994 | Asada et al. | 75/231 |

FOREIGN PATENT DOCUMENTS

| | | |
|---|---|---|
| 2213832 | 8/1989 | United Kingdom . |
| 2220421 | 1/1990 | United Kingdom . |

OTHER PUBLICATIONS

Chemical Abstract of 240225, Teraoka et al., "Sintered Copper Alloy Composite with Hot Wear Resistance for Bearings and Valve Guides", vol. 116, No. 24, Jun. 15, 1992.

Chemical Abstract of 26170, Youssef, "New Sintered Bearing Materials Containing Intermetallic Compounds", vol. 109, No. 4, Jul. 25, 1988.

Primary Examiner—Ngoclan Mai
Attorney, Agent, or Firm—Wenderoth, Lind & Ponack

[57] ABSTRACT

The invention concerns bronze-based sintered contact components for use as slide components such as clutches and brakes and is intended to provide a sintered component comprising hard particles admixed with and finely and uniformly distributed in a Cu-Sn alloy matrix to provide improved friction coeffiient, and in which the disperesed hard particls are inhibited from coming off the Cu-Sn alloy matrix during contact movement so that the sintered omponent is possessed of good friction contact chracteristics and improved mechanical properties. A sintered contact component comprising Sn, and iron-based intermetallic compound as a hard particle ingredient, and a solid lubricating ingredient which have been passed through the process of mechanical alloying, mechanical grinding or pelletizing, the Sn, iron-based intermetallic compound, and solid lubricating ingredient being uniformly dispersed in a Cu matrix.

3 Claims, 2 Drawing Sheets

SINTERED CONTACT COMPONENT

BACKGROUND OF THE INVENTION

1. Field of the Invention

The present invention relates to a bronze-based sintered contact component and a method of making the same. The component is applicable for use in the art of contact components, such as friction devices of clutches and brakes for use under dry conditions or clutches for use under wet conditions incorporated in automatic transmissions, because it has exceptional resistance to wear and fusion, can stably retain a comparatively high coefficient of friction, is very unlikely to attack counterpart material, and further has high strength, high toughness, and high hardness.

2. Description of the Prior Art

Recently, for use as materials for friction clutches and brakes to be used under dry conditions, bronze-based sintered alloys have been developed which can replace asbestos-based friction materials. For example, Japanese Patent Application Laid-Open No. 58-126948 describes a "dry sintered friction material" which comprises a bronze-based sintered alloy and hard particulate matter added thereto to provide higher coefficient of friction.

However, such sintered material has no reaction layer between the hard particulate matter dispersed in the alloy and the matrix, but involves gaps therebetween. As such, during friction contact under high-speed, high-load contact conditions, hard particles may come off the matrix, and this makes it impracticable to expect any high friction coefficient to be stably exhibited. Another problem is that fusion may occur relative to counterpart material starting from the point at which such particle fall-off has occurred. Further, the sintered material involves problems, such as bite of come-off particles and attack against counterpart material. Additionally, in the aspect of mechanical characteristics, the sintered material as an abrasion material involves the problem that aforesaid gaps will deteriorate the mechanical characteristics of the material, such as strength, toughness and hardness. Another problem is that the dispersed hard particles are diametrically large-sized on the order of 30 to 80 µm, which fact, as a source of fracture, will induce deterioration in strength and toughness.

The present inventors succeeded in uniformly dispersing various kinds of hard particles in a Cu-Sn based alloy powder or mixed powder as a matrix by mechanically alloying the former with the latter. As a result, they filed a Japanese patent application on a sintered friction material having both friction contact characteristics and mechanical characteristics under dry conditions, serially numbered as Japanese Patent Application No. 4-317756, entitled "Sintered Friction Material". Generally, prior art friction materials, including this friction material, are used together with a reinforcing plate of copper, cast iron, or stainless steel make to which the friction material is bonded. That is, from the view point of strength and toughness, it has been found impracticable to use such friction material alone in such application as structural components.

Also, for use as friction materials to be used under wet environments such as lubricating oils, primarily paper-make friction materials or carbon sintered materials have been developed. As an example of the former, Japanese Patent Application Laid-Open No. 6-25653 proposes a "paper friction material," which is a friction material containing a thermosetting resin such as phenol resin and a friction controller such as graphite powder or organic dusts as its main components, and organic fibers or carbon fibers as its reinforcing material. As an example of the latter, on the other hand, Japanese Patent Application Laid-Open No. 4-76086 proposes a "wet type friction material," which is a carbon fiber reinforced carbon sintered material obtained by sintering a complex composed of uncarbonated carbonaceous fibers and carbonaceous powder.

Both of the aforementioned materials are designed for use as friction materials to be used in automatic transmissions of automobiles. However, they show small coefficients of friction in oil as low as 0.1 to 0.15. Moreover, the paper-make friction materials lack in heat resistance so as to be worn and damaged during frictional contact under high temperatures and to deteriorate in characteristics. As a result, their coefficient of friction may lower, disadvantageously.

SUMMARY OF THE INVENTION

In order to overcome the foregoing problems, the present invention is directed to economically manufacturing a sintered component comprising hard particles admixed with and finely and uniformly distributed in a Cu-Sn alloy matrix to provide improved friction coefficient, and in which the dispersed hard particles are inhibited from coming off the Cu-Sn alloy matrix during contact movement so that the sintered component is possessed of good friction contact characteristics under dry conditions and wet conditions and improved mechanical properties.

Accordingly, in order to solve the foregoing problems, the present inventors conducted extensive experiments and studies and, as a result, they developed a method of making a high-strength sintered contact component which can stably retain high friction coefficient under dry and wet friction contact conditions and is, therefore, free of the possibility of attacking counterpart material, and which is less liable to wear due to friction and unlikely to involve fusion relative to the counterpart material.

Specifically, according to the invention, alloy compositions of sintered contact components and method of making the same are as stated below.

(1) A sintered contact component comprising Sn, an iron-based intermetallic compound as a hard particle ingredient, and a solid lubricating ingredient which have been passed through the process of mechanical alloying, mechanical grinding or pelletizing, the Sn, iron-based intermetallic compound, and solid lubricating ingredient being uniformly dispersed in a Cu matrix.

(2) A sintered contact component of the above description, wherein the component comprises 3 to 20 wt % of Sn, 15 to 25 wt % of iron-based intermetallic compound, and 0.5 to 3 wt % of solid lubricant, with the balance being made up substantially of Cu and an unavoidable impurity, and wherein the iron-based intermetallic compound is uniformly dispersed in the matrix in a particle size range of up to 15 µm maximum, with an average particle size of not more than 5 µm, there being uniformly dispersed 1 to 30 vol % of vacancies having a size of not more than 30 µm in the sintered component, so that the sintered component is possessed of high strength, good frictional contact characteristic under dry conditions and wet conditions, and high fusion resistance.

(3) A method of making a sintered contact component having high strength, good frictional contact characteristic under dry conditions and wet conditions, and high fusion resistance which comprises subjecting a material powder mixture to the process of mechanical alloying, mechanical grinding or pelletizing, the material powder mixture including a Cu-Sn alloy powder containing 3 to 20 wt % of Sn with the balance being made up substantially of Cu and an unavoidable impurity, 15 to 25 wt % of an iron-based intermetallic compound, and 0.5 to 3 wt % of a solid lubricant, thereby preparing an alloy powder having the iron-based intermetallic compound pulverized in a particle size range of up to 15 μm maximum, with an average particle size of not more than 5 μm, in which the iron-based intermetallic compound, together with the solid lubricant, is uniformly dispersed in the Cu matrix, and molding and sintering the alloy powder into a sintered product having 1 to 30 vol % of vacancies uniformly dispersed therein, the vacancies each being sized not more than 30 μm.

(4) A method of making a sintered contact component of the above description, wherein the material powder mixture is replaced by a material powder mixture comprising 3 to 20 wt % of Sn powder, 15 to 25 wt % of an iron-based intermetallic compound, and 0.5 to 3 wt % of a solid lubricant, with the balance being made up substantially of Cu powder and an unavoidable impurity.

(5) A method of making a sintered contact component having high strength, good frictional contact characteristic under dry conditions and wet conditions, and high fusion resistance which comprises subjecting a material powder mixture to the process of mechanical alloying, mechanical grinding or pelletizing, the material powder mixture comprising 3 to 20 wt % of Sn powder, and 15 to 25 wt % of an iron-based intermetallic compound, with the balance being made up substantially of Cu powder and an unavoidable impurity, so that the iron-based intermetallic compound is ground to a particle size of up to 15 μm maximum, with an average particle size of not more than 5 μm, so that the ground compound particles, together with the Sn powder, are uniformly dispersed in the Cu matrix, then admixing 0.5 to 3 wt % of a solid lubricant with the powder mixture, subjecting the resulting powder mixture to the process of mechanical alloying, mechanical grinding or pelletizing so as to permit uniform dispersion of the solid lubricant, and molding and sintering the thus obtained alloy powder into a sintered product having 1 to 30 vol % of vacancies uniformly dispersed therein, the vacancies each being sized not more than 30 μm.

(6) A method of making a sintered contact component having high strength, good frictional contact characteristic under dry conditions and wet conditions, and high fusion resistance which comprises subjecting a material powder mixture to the process of mechanical alloying, mechanical grinding or pelletizing, the material powder mixture including 3 to 20 wt % of Sn powder, with the balance being made up substantially of Cu powder and an unavoidable impurity, so that the Sn powder is uniformly dispersed in the Cu matrix, then preparing a powder mixture made up of the first mentioned powder mixture and 15 to 25 wt % of an iron-based intermetallic compound added thereto, subjecting the so prepared powder mixture to the process of mechanical alloying, mechanical grinding or pelletizing so that the intermetallic compound is ground to a particle size of up to 15 μm maximum, with an average particle size of not more than 5 μm, adding 0.5 to 3 wt % of a solid lubricant to the resulting alloy powder, then subjecting the resulting powder mixture to the process of mechanical alloying, mechanical grinding or pelletizing so as to permit uniform dispersion of the solid lubricant, and molding and sintering the thus obtained alloy powder into a sintered product having 1 to 30 vol % of vacancies uniformly dispersed therein, the vacancies each being sized not more than 30 μm.

(7) In the above described sintered compact compounds and methods of making the same, the iron-based intermetallic compound is composed of at least one, or more than one, of FeMo, FeCr, FeTi, FeW, and FeB, and the solid lubricating ingredient is composed of at least one, or more than one, of graphite, $MoS_2$, and $CaF_2$.

Nextly, the reasons why the alloy compositions and the proportion of vacancies are set as above stated will be explained.

(1) Sn

Sn, together with Cu, forms the matrix of the alloy and can enhance high temperature strength and toughness of the alloy. It also can improve fusion resistance of the alloy relative to counterpart material at elevated temperatures. If the proportion of Sn is less than 3 wt %, no such effect can be obtained, while if Sn is added in excess of 20 wt %, precipitation of a hard and brittle phase will occur, resulting in deterioration in strength and toughness. Therefore, the proportion of Sn is set within the range of 3 to 20 wt %.

(2) Hard Particles (iron-based intermetallic compound)

Hard particles are uniformly dispersed in the matrix of the sintered alloy and can inhibit adhesion of the alloy with counterpart material at normal temperature and elevated temperatures under dry and wet friction conditions, thereby improving the fusion resistance of the sintered alloy. Also, they come in direct contact with opposite material surface to provide increased coefficient of friction, thereby enhancing the wear resistance of the sintered alloy.

The particle size and proportion of such particulate will have the following effects.

If the proportion of hard particles is less than 15 wt %, no improvement in wear resistance can be obtained. If the maximum particle size is greater than 15 μm or the average particle size is greater than 5 μm, or if the proportion of hard particles is more than 25 wt %, the hard particles are likely to become a point at which cracking will occur, thus resulting in deterioration in the strength and toughness of the sintered material. Also, from the view point of counterpart attackability, addition of hard particles at such particle size and quantity levels is undesirable because it results in considerably wearing away counterpart material. When the sintered material contains 15 to 25 wt % of hard particles having a particle size range of up to 15 μm, with an average particle size of not more than 5 μm, which are finely and uniformly dispersed in the matrix, the sintered material can have good stability in friction coefficient. Preferably, therefore, the hard particles have a particle size range of up to 15 μm maximum, with an average particle size of not more than 5 μm, and the total hard particle content is 15 to 25 wt %.

The iron-based intermetallic compound is preferably comprised of at least one, or more than one, of FeMo, FeCr, FeTi, FeW, and FeB. Besides iron-based intermetallic compounds, metallic oxides, such as $Al_2O_3$, $SiO_2$, and $ZrO_2$, and ceramics, such as SiC and AlN, may be conceivable for use, but particles of these are less machinable as compared with particles of iron-based intermetallic compounds, which fact poses a problem from the view point of economy. Therefore, use of iron-based intermetallic compounds is preferred for purposes of the contact component of the invention.

However, if such iron-based intermetallic compound comes off the matrix during contact movement, there will develop particle transfer and/or adhesion relative to counterpart material starting from the location of such particle separation. Another problem is that any separated particle may bite into the counterpart material to cause wear and/or damage to the counterpart material. Therefore, in order to avoid any such occurrence so as to ensure constantly stable and high coefficient of friction, it is required that particulate intermetallic compound be uniformly dispersed in the matrix and particles thereof be inhibited from coming off the matrix.

To this end, the intermetallic compound is mechanically alloyed with a Cu-Sn-based alloy powder or a powder mixture of Su and Sn, whereby the intermetallic compound as ground to a particle size of up to 15 μm, maximum, with an average particle size of 5 μm, can be finely and uniformly dispersed in the Cu-Sn-based alloy particles. After sintering, a reaction layer is formed at the interface between the Cu-Sn-based alloy or the matrix and the intermetallic compound, whereby the intermetallic compound can be firmly immobilized in the matrix. Specifically, it has been found that only by employing mechanical powder grinding techniques, such as mechanical alloying, mechanical grinding, and pelletizing, is it possible to obtain a Cu-Sn-based alloy powder such that intermetallic compound particles are finely and uniformly dispersed in a particulate mass of the Cu-Sn-based alloy powder so that they are unlikely to come off sintered matrix during contact movement. It is noted that such mechanical powder grinding is carried out in dry process, and not in wet process as in conventional ball milling or grinding. In some cases, stearic acid or alcohol, as a PCA (process control agent), may be added in a small quantity in order to prevent excessive agglomeration. For carrying out the process, an ATTORITOR unit or ball mill may be suitably employed. The former is suited for high-speed processing because it exhibits high grinding efficiency. The latter involves prolonged grinding operation but permits easy atmosphere control and has a relatively good advantage in respect of economy, only if the arrangement for input energy is properly designed, as in oscillating mill or planetary ball mill.

(3) Solid Lubricating Ingredient

The solid lubricating ingredient is effective in correcting the attackability of a sintered contact component against counterpart material under dry friction conditions and also in moderately stabilizing a comparatively high coefficient of the order of about 0.4 to 0.6 under dry contact conditions at elevated temperatures, whereby surface lubricity between contact surfaces can be enhanced, and whereby the problem of squeaks, vibrations and noisiness upon contact can be reasonably overcome.

Further, under wet friction conditions, if the sliding speed is increased, lubricating oil is taken into the vacancies by wedging effect of the vacancies present in the contact surface, forming a lubricating film. As a result, the coefficient of friction lowers and varies. However, the solid lubricating ingredient, if contained in the contact component, makes it possible to improve the stability of the coefficient of friction with respect to the sliding speed.

In Cu-Sn-based sintered alloys, solid lubricating ingredients having these characteristic features are graphite, $MoS_2$ and $CaF_2$, which economically involve little problem, if any. As another lubricating ingredient, Pb, for example, used in Cu-Sn alloy-made bearings, but use of this material in a contact component involves fall-off possibilities during contact movement because the material does not function to produce a compound in association with the matrix and is present in the form of fine particles in dendrite arm spacings of a phase. Therefore, graphite, $MoS_2$, and $CaF_2$ are selected as solid lubricating ingredients.

However, mere mixing of particles of such solid lubricant with the Cu-Sn mixed powder or alloy powder and mere sintering of the mixture would cause the lubricant ingredient to be present in the grain boundary of the Cu-Sn matrix, which poses the problem of strength and toughness deterioration.

Therefore, after the lubricant is admixed with the Cu-Sn mixed powder or Cu-Sn alloy powder, the mixture is subjected to the process of mechanical alloying as represented by the foregoing mechanical alloying, mechanical grinding, or pelletizing, so that particles of the lubricant may be uniformly dispersed in the particulate matrix of Cu-Sn-based alloy powder. Therefore, sintering the alloyed mixture provides a sintered alloy such that no lubricant component is present in the grain boundary of the powder matrix, which fact insures that the sintered alloy is reasonably prevented from possible degradation in strength and toughness.

The lubricant content is preferably 0.5 to 3 wt % of at least one of graphite, $MoS_2$, and $CaF_2$. If the content is less than 0.5 wt %, the above mentioned effect cannot be obtained. Use of the lubricant in excess of 3 wt % is undesirable because it will result in lowered level of friction coefficient and also in a noticeable decrease in the strength and toughness of the sintered product.

(4) Vacancy

Vacancies are of a size of not more than 30 μm and are uniformly distributed over the friction contact surface of the sintered alloy, so that they are subject to deformation upon surface contact of the sintered alloy and will produce wedging effect to allow air flow into the vacancies during contact movement, which in turn will produce buoyancy. Therefore, vacancies provide good fusion resistance and improved adaptability relative to counterpart component. A vacancy size greater than 30 μm may be a cause of cracking and results in considerable decrease in the strength and toughness of the sintered product. If the volume of vacancies is less than 1 vol %, the above mentioned advantage is unlikely to be obtained. If vacancies are distributed in excess of 30 vol %, the strength and toughness of the sintered alloy may be reduced. If vacancies are unevenly distributed, stable level of friction coefficient cannot be obtained, because the adaptability of the sintered alloy relative to counterpart material will be locally reduced. In the sintered contact component of the invention, therefore, it is desirable that vacancies should have a size of not more than 30 μm and be uniformly distributed within a range of 1 to 30 vol % in the contact component. For the purpose of the present invention, above specified vacancy size and volume can be attained by controlling the pressure during the process of powder pressing and molding.

Sintered contact components having the foregoing alloy composition and made according to the foregoing method have mechanical characteristics, such as strength, toughness and hardness, friction resistance and self-lubricating property, which are sufficient for use as structural material of such contact component per se as a single unit and without reinforcement. Under dry friction contact conditions, conventional Cu-Sn-based alloys have a friction coefficient range of about 0.2 to 0.3 during an initial contact period. As friction progresses, the friction coefficient of such alloy tends to change upward and finally the sintered alloy goes into fusion with counterpart material or the alloy itself gets worn. In contrast to this, the sintered contact component of the invention can stably retain a comparatively high friction coefficient of about 0.4 to 0.6 and, even when same material or an iron-copper alloy or the like is used as a counterpart material, the contact component is unlikely to attack the counterpart and is not liable to fusion, wear or damage in relation to the counterpart.

Moreover, under wet friction contact conditions, whereas the conventional paper-make friction materials and carbon fiber contained carbon sintered friction materials have a coefficient of friction in the range of about 0.1 to 0.15, the contact component of the present invention can stably maintain a relatively high coefficient of friction as much as about 0.2 to 0.4. Yet, even when it takes as the counterpart material a steel material such as cast iron or stainless, the contact component will neither attack the counterpart material nor yield fusion or wear damage with the counterpart material.

DETAILED DESCRIPTION OF THE PREFERRED EMBODIMENTS (Example 1)Alloy compositions of sintered contact components according to the invention and of comparative materials are shown in Table 1. Mechanical characteristics of the sintered contact components, and abrasion test results (friction coefficient and quantities of wear with respect to sintered materials and counterpart material SS41) are shown in Table 2. Sample powders are molded and sintered under production conditions according to the respective processes shown in FIG. 1. (In the figure, "Mechanical grinding/ mixing" means mechanical alloying, mechanical grinding, and pelletizing.)

Figure 2:
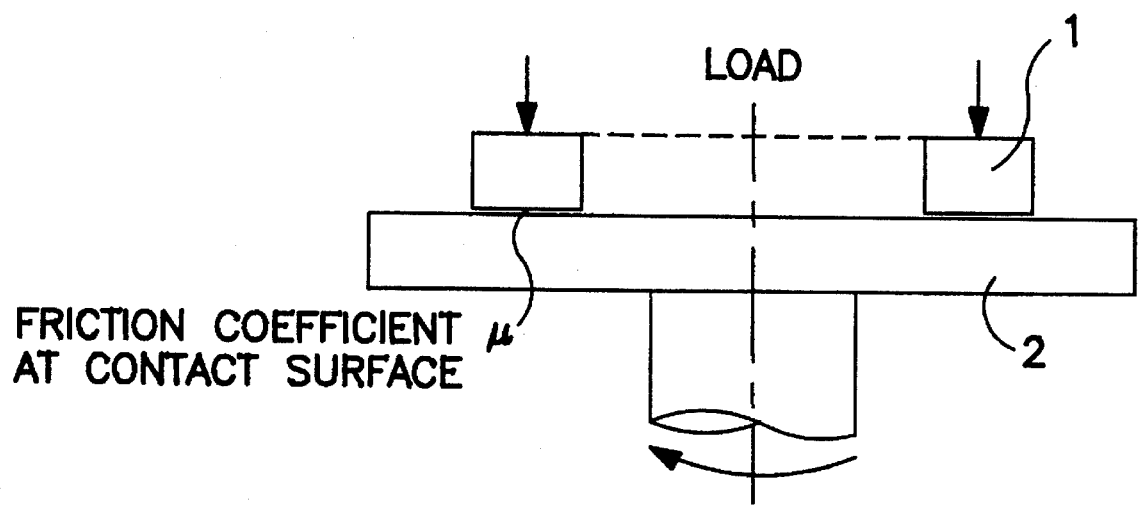
FIG. 2 is an explanatory view showing a dry abrasion tester for carrying out abrasion tests with respect to sintered contact components of the invention.

Abrasion tests were carried out employing the dry abrasion tester shown in FIG. 2. Test conditions were: load, 25.0 kgf; speed, 10 m/sec.; abrasion time, 5 hrs; atmosphere, in the atmosphere (dry). Sintered contact component 1 ($\phi 60 \times \phi 45 \times 5$ mm, ring-shaped) was set on the stationary side, and counterpart material or SS41 steel material 2 ($\phi 70 \times 5$ mm, disk-shaped) was set on the rotating side.

Figure 1:
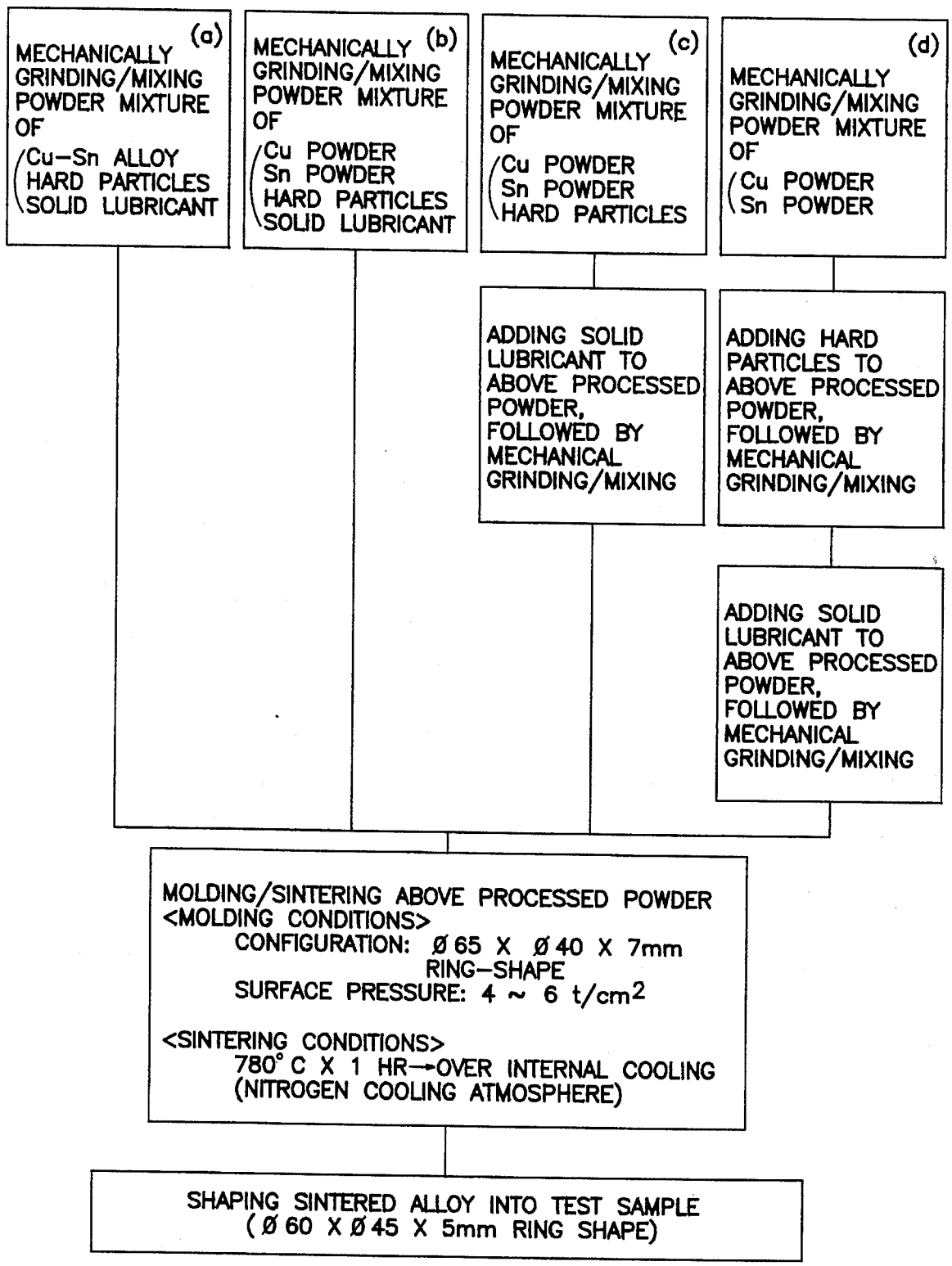
FIG. 1 is a flow chart showing the process of making sintered contact components according to the present invention.

In Tables 1 and 2, Nos. 1 through 17 represent sintered components of the invention, and Nos. 18 through 28 represent comparative materials. In Table 1, only vacancies are expressed in vol %, while all other quantity values are expressed in wt %. Characters a, b, c, and d in the process column represent respective processes shown in FIG. 1, and characters A, B, and C for solid lubricants represent: A, graphite; B, $MoS_2$; and C, $CaF_2$. In the Remark column, *1, *2, and *3 stand for the following:

*1) An alloy produced by subjecting a mixed powder to mechanical grinding/mixing according to the process (a) in FIG. 1, with grinding conditions being changed so that the dispersed hard particles or Fe-based intermetallic compound particles were ground to an average particle size of 15 µm, and by molding and sintering the so treated mixture.

*2) An alloy produced by subjecting a mixed powder to mechanical grinding/mixing according to the process (a) in FIG. 1, with surface pressure conditions during the stage of powder molding being changed so that vacancies distributed in the powder molded product were sized 45 µm average, and by molding and sintering the so treated mixture.

*3) An alloy produced by simply mixing various powders having prescribed compositions without subjecting them to the process of mechanical grinding/mixing, such as mechanical alloying, mechanical grinding, or pelletizing, and then sintering the mixture.

TABLE 1

| No. | Process | Sn | Hard particulate | | | | | | Solid lubricant | | | | Vacancy | Cu | Remark |
|---|---|---|---|---|---|---|---|---|---|---|---|---|---|---|---|
| | | | FeMo | FeCr | FeW | FeTi | FeB | Total | A | B | C | Total | vol % | | |
| 1 | a | 10 | 20 | 0 | 0 | 0 | 0 | 20 | 1 | 0 | 0 | 1 | 18 | Balance | |
| 2 | a | 10 | 0 | 20 | 0 | 0 | 0 | 20 | 1 | 0 | 0 | 1 | 18 | ↑ | |
| 3 | a | 12 | 0 | 0 | 20 | 0 | 0 | 20 | 1 | 0 | 0 | 1 | 20 | ↑ | |
| 4 | a | 10 | 0 | 0 | 0 | 20 | 0 | 20 | 1 | 0 | 0 | 1 | 20 | ↑ | |
| 5 | s | 12 | 0 | 0 | 0 | 0 | 20 | 20 | 1 | 0 | 0 | 1 | 20 | ↑ | |
| 6 | n | 10 | 15 | 0 | 0 | 0 | 0 | 15 | 1 | 0 | 0 | 1 | 15 | ↑ | |
| 7 | c | 10 | 25 | 0 | 0 | 0 | 0 | 25 | 1 | 0 | 0 | 1 | 25 | ↑ | |
| 8 | b | 10 | 10 | 10 | 0 | 0 | 0 | 20 | 1 | 0 | 0 | 1 | 25 | ↑ | |
| 9 | c | 0 | 0 | 0 | 0 | 20 | 0 | 20 | 1 | 0 | 0 | 1 | 20 | ↑ | |
| 10 | d | 15 | 20 | 0 | 0 | 0 | 0 | 20 | 0.5 | 0 | 0 | 0.5 | 20 | ↑ | |
| 11 | d | 10 | 20 | 0 | 0 | 0 | 0 | 20 | 2 | 0 | 0 | 2 | 18 | ↑ | |
| 12 | a | 12 | 20 | 0 | 0 | 0 | 0 | 20 | 3 | 0 | 0 | 3 | 5 | ↑ | |
| 13 | a | 10 | 0 | 20 | 0 | 0 | 0 | 20 | 0 | 1 | 0 | 1 | 20 | ↑ | |
| 14 | a | 10 | 20 | 0 | 0 | 0 | 0 | 20 | 0 | 20 | 0 | 2 | 17 | ↑ | |
| 15 | b | 10 | 10 | 10 | 0 | 0 | 0 | 20 | 0 | 0 | 1 | 1 | 20 | ↑ | |
| 16 | c | 10 | 20 | 0 | 0 | 0 | 0 | 20 | 0 | 0 | 2 | 2 | 14 | ↑ | |
| 17 | a | 12 | 20 | 0 | 0 | 0 | 0 | 20 | 0.5 | 0.5 | 0 | 1 | 25 | ↑ | |
| 18 | a | 2 | 20 | 0 | 0 | 0 | 0 | 20 | 1 | 0 | 0 | 1 | 10 | ↑ | |
| 19 | a | 35 | 20 | 0 | 0 | 0 | 0 | 10 | 1 | 0 | 0 | 1 | 10 | ↑ | |
| 20 | a | 10 | 10 | 0 | 0 | 0 | 0 | 10 | 1 | 0 | 0 | 1 | 10 | ↑ | |
| 21 | a | 10 | 15 | 0 | 15 | 0 | 0 | 30 | 1 | 0 | 0 | 1 | 10 | ↑ | |
| 22 | b | 10 | 20 | 0 | 0 | 0 | 0 | 20 | 0 | 0 | 0 | 0 | 10 | ↑ | |
| 23 | b | 10 | 20 | 0 | 0 | 0 | 0 | 20 | 4 | 0 | 0 | 4 | 10 | ↑ | |
| 24 | a | 10 | 20 | 0 | 0 | 0 | 0 | 20 | 1 | 0 | 0 | 1 | 0 | ↑ | |
| 25 | a | 10 | 20 | 0 | 0 | 0 | 0 | 20 | 1 | 0 | 0 | 1 | 35 | ↑ | |
| 26 | a | 10 | 20 | 0 | 0 | 0 | 0 | 20 | 1 | 0 | 0 | 1 | 20 | ↑ | *1 |
| 27 | a | 10 | 20 | 0 | 0 | 0 | 0 | 20 | 1 | 0 | 0 | 1 | 20 | ↑ | *2 |

TABLE 1-continued

| | | | Hard particulate | | | | | | Solid lubricant | | | | Vacancy | | |
|---|---|---|---|---|---|---|---|---|---|---|---|---|---|---|---|
| No. | Process | Sn | FeMo | FeCr | FeW | FeTi | FeB | Total | A | B | C | Total | vol % | Cu | Remark |
| 28 | — | 10 | 20 | 0 | 0 | 0 | 0 | 20 | 1 | 0 | 0 | 1 | 20 | ↑ | *3 |

TABLE 2

| | Mechanical Characteristic | | | Friction Contact Characteristic | | | |
|---|---|---|---|---|---|---|---|
| | | | | | Wear[1] mg | | |
| Sample No. | UTS MPa | Elongation % | Bend resistance MPa | μ value | Sintering material | SS41 material | Condition of damage |
| 1 | 220 | 7.5 | 360 | 0.52 | 6 | 2 | No damage |
| 2 | 222 | 6.8 | 351 | 0.55 | 7 | 3 | No damage |
| 3 | 216 | 7.2 | 348 | 0.54 | 5 | 4 | No damage |
| 4 | 214 | 7.0 | 345 | 0.55 | 6 | 3 | No damage |
| 5 | 218 | 7.1 | 358 | 0.57 | 7 | 4 | No damage |
| 6 | 245 | 6.5 | 388 | 0.50 | 7 | 2 | No damag |
| 7 | 204 | 7.7 | 340 | 0.60 | 6 | 3 | No damage |
| 8 | 207 | 7.0 | 336 | 0.57 | 8 | 3 | No damage |
| 9 | 216 | 7.0 | 357 | 0.53 | 5 | 3 | No damage |
| 10 | 211 | 6.6 | 344 | 0.60 | 4 | 4 | No damage |
| 11 | 223 | 6.6 | 353 | 0.51 | 5 | 5 | No damage |
| 12 | 273 | 9.9 | 402 | 0.45 | 5 | 4 | No damage |
| 13 | 220 | 6.8 | 354 | 0.55 | 7 | 6 | No damage |
| 14 | 226 | 6.6 | 355 | 0.51 | 5 | 4 | No damage |
| 15 | 218 | 6.7 | 354 | 0.56 | 6 | 3 | No damage |
| 16 | 240 | 7.4 | 384 | 0.48 | 6 | 5 | No damage |
| 17 | 208 | 6.6 | 333 | 0.50 | 5 | 6 | No damage |
| 18 | 112 | 8.8 | 167 | 0.72 | $2 \times 10^3$ | 5 | Sintered material worn |
| 19 | 270 | 1.6 | 410 | 0.77 | 11 | 68 | SS41 attacked |
| 20 | 240 | 7.8 | 385 | 0.28 | 8 | 6 | No damage |
| 21 | 165 | 1.9 | 197 | 0.64 | 12 | 105 | SS41 snacked |
| 22 | 276 | 9.6 | 415 | 0.86 | $8 \times 10^3$ | $-6 \times 10^3$ | Fusion |
| 23 | 126 | 2.2 | 171 | 0.30 | 9 | 6 | No damage |
| 24 | 291 | 10.6 | 432 | 0.88 | $8 \times 10^3$ | $-5 \times 10^3$ | Fusion |
| 25 | 94 | 1.1 | 101 | 0.43 | $2 \times 10^3$ | 6 | Sintered material worn |
| 26 | 114 | 2.0 | 133 | 0.66 | 11 | 95 | SS41 attacked |
| 27 | 105 | 1.6 | 124 | 0.51 | $3 \times 10^3$ | 5 | Sintered material worn |
| 28 | 123 | 2.4 | 165 | 0.28 | $4 \times 10^3$ | $-3 \times 10^3$ | Fusion |

[1] Minus (−) sign indicates by deposition.

TABLE 3

| | | | Friction Contact Characteristic | | | |
|---|---|---|---|---|---|---|
| | | | | Wear[1] mg | | |
| Sample No. | Sample No. | Sliding speed m/sec. | μ value | Sintering material | S35C material | Condition of damage |
| 1 | 1 | 0.1 | 0.37 | 3 | 1 | No damage |
| 2 | 1 | 1 | 0.36 | 3 | 1 | No damage |
| 3 | 1 | 5 | 0.36 | 3 | 1 | No damage |
| 4 | 1 | 10 | 0.35 | 4 | 1 | No damage |
| 5 | 1 | 20 | 0.33 | 4 | 1 | No damage |
| 6 | 1 | 40 | 0.33 | 4 | 2 | No damage |
| 7 | 8 | 5 | 0.38 | 3 | 0 | No damage |
| 8 | 8 | 20 | 0.34 | 3 | 1 | No damage |
| 9 | 16 | 8 | 0.36 | 2 | 1 | No damage |
| 10 | 16 | 30 | 0.34 | 3 | 2 | No damage |
| 11 | 18 | 5 | 0.71 | $6 \times 10^2$ | $-5 \times 10^2$ | Sintered material worn and fused |
| 12 | 19 | 10 | 0.68 | 44 | $4 \times 10^2$ | S35C attacked and fused |
| 13 | 20 | 5 | 0.15 | 2 | 1 | No damage |
| 14 | 21 | 5 | 0.68 | 26 | $3 \times 10^2$ | S35C attacked |
| 15 | 22 | 10 | 0.77 | $7 \times 10^2$ | $-4 \times 10^2$ | Fusion |
| 16 | 24 | 5 | 0.71 | $4 \times 10^2$ | $-2 \times 10^2$ | Fusion |
| 17 | 28 | 5 | 0.72 | $7 \times 10^3$ | $-5 \times 10^3$ | Sintered material worn and fused |

TABLE 3-continued

| | | | | Friction Contact Characteristic | | | |
|---|---|---|---|---|---|---|---|
| | | | | | Wear[1] mg | | |
| Sample No. | Sample No. | Sliding speed m/sec. | μ value | Sintering material | S35C material | Condition of damage | |
| 18 | 28 | 10 | 0.68 | $5 \times 10^3$ | $-2 \times 10^2$ | Sintered material worn and fused | |

[1] Minus (−) sign indicates increase by deposition.

Abrasion Test Conditions:
Load: 125 kgf
Speed: 0.1 m/sec–40 m/sec
Friction time: 5 hr, continuous
Atmosphere: in ATF (oil temperature: 80° C.)

Material Nos. 1 through 17 represent alloys according to the invention, and their mechanical characteristics and the results of abrasion test with them are satisfactory as shown in Table 2. Test results with respect to comparative materials are as stated below.

18: Matrix strength is insufficient because the Sn content is so small as 2%, so that the friction material is worn away, which results in an increase in μ value.

19: The Sn content is so large as 35%, so that the matrix becomes so much hardened as to cause the friction material to attack the counterpart material, which results in an increase in μ value.

20: The hard particle content is so small as 10 wt %, so that sufficient level of μ value cannot be attained.

21: The hard particle content is so large as 30 wt %, so that sufficient level of μ value cannot be attained.

22: Absence of solid lubricant causes lack of lubrication that results in fusion with the counterpart material.

23: The proportion of solid lubricant is so large as 4%, resulting in lowered strength and toughness characteristics.

24: Non-presence of vacancy results in reduced fusion resistance and occurrence of fusion with the counterpart material.

25: The presence of vacancies in such a large volume as 35% causes lack of strength and toughness, resulting in wearing away of friction material.

26: The particle size of hard particles is as large as 15 μm, resulting in decreased strength and toughness, and also in the trouble of attacking relative to the counterpart material.

27: Vacancy size is as large as 45 μm, which results in strength and toughness insufficiency and friction material wear.

28: Since respective powders having specified ingredients are simply mixed without being subjected to mechanical grinding/mixing, followed by sintering, no reaction layer is formed between the hard particles and the matrix. This, coupled with the fact that there are present very coarse particles, causes hard particles to come off the matrix, resulting in the trouble of fusion with the counterpart material and also in decreased strength and toughness with respect to the sintered alloy.

EXAMPLE 2

Figure 3:
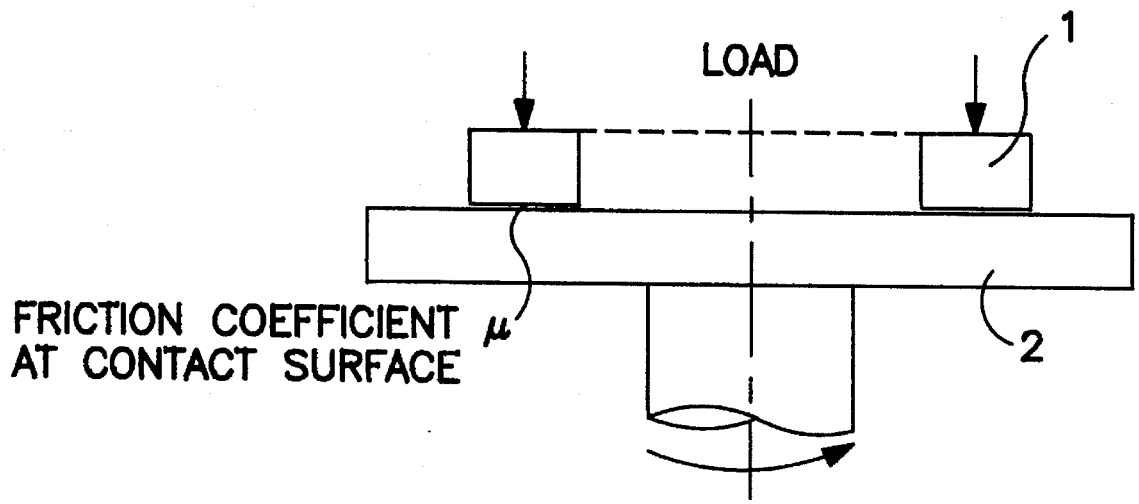
FIG. 3 is an explanatory view showing a wet abrasion tester for carrying out abrasion tests with respect to sintered contact components of the invention.

Table 3 shows results of abrasion tests (coefficient of friction relative to sliding speed and amount of wear of friction material and counterpart S35C material) on the sintered friction material of the present invention and comparative materials prepared with the alloy composition and fabricating process as described in Table 2. It is noted that the abrasion tests were carried out by a wet abrasion tester shown in FIG. 3.

In Table 3, designated by Nos. 1 through 10 are sintered materials of the present invention, and by Nos. 11 through 18 are comparative materials. Materials 1 through 10 are alloys of the present invention and their results of the abrasion tests are successful as seen in Table 3. On the other hand, test results of the comparative materials are as follows:

11: Matrix strength is insufficient because the Sn content is so small as 2%, so that the friction material is worn away and fused, which results in an increase in μ value.

12: The Sn content is so large as 35%, so that the matrix becomes so much hardened as to cause the friction material to attack the counterpart S35C material with occurrence of fusion, which results in an increase in μ value.

13: The hard particle content is so small as 10 wt %, so that sufficient level of μ value cannot be attained.

14: The hard particle content is so large as 30 wt %, so that the friction material attacks the counterpart S35C material with occurrence of fusion, which results in an increase in μ value.

15: Absence of solid lubricant causes lack of lubrication that results in fusion with the counterpart material.

16: Non-presence of vacancy results in reduced fusion resistance and occurrence of fusion with the counterpart material.

17: Since respective powders having specified ingredients are simply mixed without being subjected to mechanical grinding/mixing, followed by sintering, no reaction layer is formed between the hard particles and the matrix. This, coupled with the fact that there are present very coarse particles, causes hard particles to come off the matrix, resulting in the trouble of fusion with the counterpart material and therefore in an increase in μ value.

18: Since respective powders having specified ingredients are simply mixed without being subjected to mechanical grinding/mixing, followed by sintering, no reaction layer is formed between the hard particles and the matrix. This, coupled with the fact that there are present very coarse particles, causes hard particles to come off the matrix, resulting in the trouble of fusion with the counterpart material and therefore in an increase in μ value.

The bronze-based sintered contact component has self-lubricating characteristics. This permits a comparatively high friction coefficient of about 0.4 to 0.6 to be stably maintained under dry friction contact conditions, and further permits a friction coefficient of about 0.2 to 0.4 to be stably maintained under wet friction contact conditions. Even where same material or iron/copper alloy is used as counterpart material, the contact component is not likely to attack the counterpart nor is it liable to come into fusion with the counterpart. Further, the sintered component has sufficient mechanical characteristics, such as strength, toughness, and hardness, it can be used itself alone as a structural material, Therefore, the material of the invention can be used in various applications, including clutch material for compressors and friction material for automobiles, autocycles, and other vehicles.

What is claimed is:

1. A sintered contact component comprising an iron-based intermetallic compound as a hard particle ingredient being finely and uniformly dispersed in former Cu-Sn based alloy particles as a matrix, wherein the component comprises 3 to 20 wt % of Sn, 15 to 25 wt % of an iron-based intermetallic compound, and 0.5 to 3 wt % of solid lubricant, with the balance being made up substantially of Cu and unavoidable impurities, and wherein the iron-based intermetallic compound is uniformly dispersed in the former Cu-Sn based alloy particles as the matrix in a particle size range of up to 15 μm maximum, with an average particle size of not more than 5 μm, there being uniformly dispersed 1 to 30 vol % of vacancies having a size of not more than 30 μm in the sintered component, so that the sintered component is possessed of high strength, good frictional contact characteristic under dry conditions and wet conditions and high fusion resistance.

2. A sintered contact component as defined in claim 1, wherein the iron-based intermetallic compound is composed of at least one, or more than one, FeMo, FeCr, FeTi, FeW, and FeB.

3. A sintered contact component as defined in claim 1, wherein the solid lubricating ingredient is composed of at least one, or more than one, of graphite, $MoS_2$, and $CaF_2$.

* * * * *